(12) United States Patent
Zeng et al.

(10) Patent No.: US 11,465,399 B2
(45) Date of Patent: Oct. 11, 2022

(54) BONDING DEVICE AND BONDING METHOD

(71) Applicants: Chengdu BOE Optoelectronics Technology Co., Ltd., Chengdu (CN); BOE Technology Group Co., Ltd., Beijing (CN)

(72) Inventors: Fei Zeng, Beijing (CN); Jialin Wang, Beijing (CN); Jia Deng, Beijing (CN); Chaoxue Qin, Beijing (CN); Haitao Liang, Beijing (CN); Zhibing Lin, Beijing (CN); Guodong Zhou, Beijing (CN)

(73) Assignees: CHENGDU BOE OPTOELECTRONICS TECHNOLOGY CO., LTD., Sichuan (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/352,275

(22) Filed: Jun. 19, 2021

(65) Prior Publication Data
US 2022/0024196 A1 Jan. 27, 2022

(30) Foreign Application Priority Data
Jul. 27, 2020 (CN) .......................... 202010731826.0

(51) Int. Cl.
*B32B 38/18* (2006.01)
*B29C 63/02* (2006.01)
(Continued)

(52) U.S. Cl.
CPC .......... *B32B 38/1825* (2013.01); *B29C 63/02* (2013.01); *B29C 63/48* (2013.01);
(Continued)

(58) Field of Classification Search
CPC ............ B32B 38/1825; B32B 38/1866; B32B 2038/002; B29C 63/02; B29C 63/48; B29C 2063/488
See application file for complete search history.

(56) References Cited

U.S. PATENT DOCUMENTS

2019/0329540 A1* 10/2019 Kim ......................... B29C 65/48
2021/0379881 A1* 12/2021 Lee .......................... H01L 51/56

FOREIGN PATENT DOCUMENTS

CN 104471630 A * 3/2015
CN 109435411 A * 3/2019

OTHER PUBLICATIONS

CN104471630A Machine Translation of Description (EPO/Google) (Year: 2021).*

(Continued)

*Primary Examiner* — Cynthia L Schaller
(74) *Attorney, Agent, or Firm* — IPro, PLLC

(57) ABSTRACT

A bonding device includes: a supporting assembly, comprising a first and second supporting bodies arranged in a first direction, at least one of the first and second supporting bodies is movable in the first direction, the supporting assembly having an upper surface which faces a flexible substrate and matches an inner surface of the flexible substrate; and a stretching assembly, including a carrier film and a plurality of driving elements, a central area of the carrier film being attached to the inner surface of the flexible substrate, at least two of the plurality of driving elements arranged oppositely in the first direction, at least two of the plurality of driving elements arranged oppositely in a second direction, the plurality of driving elements are connected to peripheral portions of the carrier film, and stretches the peripheral portions of the carrier film to align the inner surface with the supporting assembly.

11 Claims, 5 Drawing Sheets

(51) Int. Cl.
 *B29C 63/48* (2006.01)
 *B32B 38/00* (2006.01)
(52) U.S. Cl.
 CPC .... *B32B 38/1866* (2013.01); *B29C 2063/488* (2013.01); *B32B 2038/0028* (2013.01)

(56) References Cited

OTHER PUBLICATIONS

CN109435411A Machine Translation of Description (EPO/Google) (Year: 2021).*

* cited by examiner

BONDING DEVICE AND BONDING METHOD

CROSS REFERENCES TO RELATED APPLICATIONS

The present disclosure claims the priority of a Chinese patent application filed with National Intellectual Property Administration, P.R.C. under CN 202010731826.0 and titled "Bonding Device and Bonding Method" on Jul. 27, 2020, the entire content of which is incorporated into the present disclosure by reference.

TECHNICAL FIELD

Embodiments of the present disclosure relate to a bonding device and a bonding method for bonding a flexible substrate to a protective cover plate.

BACKGROUND

With the rapid development of display technology, curved display technology has become increasingly mature. Among them, organic light-emitting diode (OLED) display technology is of most representative. Typically, after a flexible substrate is manufactured, it is required to be bonded to a protective cover plate through tools such as a bonding device to form a final curved display device.

The bending forms of flexible substrates mainly include two forms: small-angle bending and large-angle bending. It is usually required to design different bonding devices for flexible substrates with different bending angles.

SUMMARY

At least one embodiment of the present disclosure provides a bonding device, including: a supporting assembly including a first supporting body and a second supporting body arranged in a first direction, at least one of the first supporting body and the second supporting body configured to be movable in the first direction, the supporting assembly having an upper surface facing a flexible substrate, the upper surface matching an inner surface of the flexible substrate; and a stretching assembly including a carrier film and a plurality of driving elements, a central area of the carrier film configured to be attached to the inner surface of the flexible substrate, at least two first driving elements of the plurality of driving elements arranged opposite to each other in the first direction, at least two driving elements of the plurality of driving elements arranged opposite to each other in a second direction, the plurality of driving elements all connected to a peripheral portion of the carrier film, and the plurality of driving elements configured to stretch the peripheral portion of the carrier film and drive the inner surface of the flexible substrate to align with the upper surface of the supporting assembly.

In some embodiments of the present disclosure, the inner surface of the flexible substrate includes a first curved surface, a second curved surface, a third curved surface, and a fourth curved surface, and the upper surface of the supporting assembly includes a first supporting surface, a second supporting surface, a third supporting surface, a fourth supporting surface, a fifth supporting surface and a sixth supporting surface; the first supporting surface is disposed on the first supporting body and faces away from the second supporting body, the first supporting surface matches the first curved surface in shape and is configured to support the first curved surface; the second supporting surface is disposed on the second supporting body and faces away from the first supporting body, the second supporting surface matches the second curved surface in shape and is configured to support the second curved surface; the third supporting surface and the fifth supporting surface are provided on the first supporting body, the fourth supporting surface and the sixth supporting surface are provided on the second supporting body, the third supporting surface and the fourth supporting match the third curved surface in shape and are configured to support the third curved surface; the fifth supporting surface and the sixth supporting surface match the fourth curved surface in shape and are configured to support the fourth curved surface; and the third supporting surface and the fourth supporting surface are arranged in the first direction, and the fifth supporting surface and the sixth supporting surface are arranged in the first direction.

In some embodiments of the present disclosure, a central angle corresponding to the first supporting surface ranges from 20° to 80°, and a central angle corresponding to the second supporting surface ranges from 20° to 80°, a central angle corresponding to the third supporting surface ranges from 20° to 80°, a central angle corresponding to the fourth supporting surface ranges from 20° to 80°, a central angle corresponding to the fifth supporting surface ranges from 20° to 80°, and a central angle corresponding to the sixth supporting surface ranges from 20° to 80°.

In some embodiments of the present disclosure, the first supporting body includes a first sub-support and a second sub-support arranged in the second direction, and the second supporting body includes a third sub-support and a fourth sub-support arranged in the second direction, at least one of the first sub-support and the second sub-support is configured to be movable in the second direction, and at least one of the third sub-support and the fourth sub-support is configured to be movable in the second direction; and the first supporting surface is jointly formed by the first sub-support and the second sub-support, and the second supporting surface is jointly formed by the third sub-support and the fourth sub-support.

In some embodiments of the present disclosure, the bonding device includes a base, the first supporting body and the second supporting body are configured to be slidable with respect to the base, and a sum of a sliding stroke of the first supporting body and a sliding stroke of the second supporting body is less than a sum of a size of the third supporting surface in the first direction and a size of the fifth supporting surface in the first direction or a sum of a size of the fourth supporting body in the first direction and a size of the sixth supporting surface in the first direction.

In some embodiments of the present disclosure, the inner surface of the flexible substrate comprises a first curved surface and a second curved surface, and the upper surface of the supporting assembly comprises a first supporting surface and a second supporting surface; the first supporting surface is disposed on the first supporting body and faces away from the second supporting body, the first supporting surface matches the first curved surface in shape and is configured to support the first curved surface; the second support surface is disposed on the second supporting body and faces away from the first supporting body, the second supporting surface matches the second curved surface in shape and is configured to support the second curved surface.

In some embodiments of the present disclosure, a central angle corresponding to the first supporting surface is not less than 90°, and a central angle corresponding to the second supporting surface is not less than 90°.

In some embodiments of the present disclosure, each of the plurality of driving elements includes a clamp and a roller, the clamp is configured to clamp the peripheral portion of the carrier film, and apply a tensile force to the peripheral portion of the carrier film, and the roller is configured to support the peripheral portion of the carrier film and change a direction of the tensile force.

In some embodiments of the present disclosure, the supporting assembly includes an elastic supporting body, the elastic supporting body includes a main supporting body and at least four fixing parts connected to the main supporting body, the first supporting body and the second supporting body support the flexible substrate through the main supporting body; and the bonding device further includes a base, the base is configured to support the supporting assembly, the at least four fixing parts are connected to the base, and two fixing parts of the at least four fixing parts are disposed opposite to each other in the first direction, and remaining fixing parts of the at least four fixing parts are disposed opposite to each other in the second direction.

In some embodiments of the present disclosure, the base includes at least four mounting parts, and the at least four fixing parts are connected to the at least four mounting parts respectively.

In some embodiments of the present disclosure, the bonding device further includes a fixing jig in which an accommodating space is provided, and the accommodating space is configured to accommodate a protective cover plate to be bonded to the flexible substrate.

At least one embodiment of the present disclosure provides a method of bonding a flexible substrate through the bonding device as described above, wherein the bonding method includes: placing a flexible substrate on the supporting assembly, and applying a force by the stretching assembly to make the flexible substrate bent toward the supporting assembly; accommodating the protective cover plate in the accommodating space in the fixed jig; driving the supporting assembly and the flexible substrate to enter the accommodating space; driving at least one of the first supporting body and the second supporting body to move to a bonding position in the first direction; and bonding the flexible substrate and the protective cover plate.

DETAILED DESCRIPTION OF THE EMBODIMENTS

Figure 1:
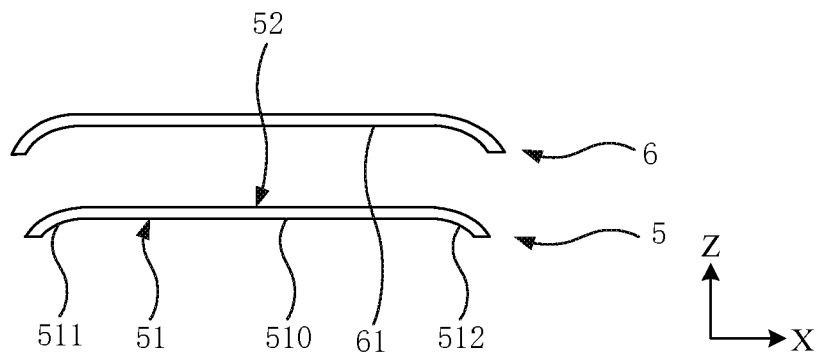
FIG. 1 illustrates a schematic front view of a flexible substrate and a protective cover plate before bonding.

The exemplary embodiments will be described in detail here, and examples thereof are illustrated in the accompanying drawings. In case that the following description refers to the drawings, unless otherwise indicated, the same reference sings in different drawings indicate the same or similar elements. The embodiments described in the following exemplary embodiments do not represent all embodiments consistent with the present disclosure. On the contrary, they are merely examples of devices consistent with some aspects of the present disclosure as set forth in the appended claims.

The terms used in the present disclosure are only for the purpose of describing specific embodiments, and cannot be construed as a limit to the present disclosure. Unless otherwise defined, the technical terms or scientific terms used in the present disclosure shall have the common meanings understood by one of ordinary skill of the art to which this disclosure belongs. The "first", "second" and similar words used in the specification and claims of the present disclosure do not denote any order, quantity or importance, but are only used to distinguish different components. Similarly, similar words such as "a" or "one" do not mean a quantity limit, but mean that there is at least one. "Multiple" or "several" means two or more. Unless otherwise indicated, similar words such as "front", "rear", "lower" and/or "upper" are only for convenience of description, and are not limited to a position or a spatial orientation. "Including" or "comprising" and other similar words mean that the elements or items before "including" or "comprising" cover the elements or items listed after "including" or "comprising" and their equivalents, and do not exclude other elements or objects. Similar words such as "connected" or "linked" are not limited to physical or mechanical connections, and may include electrical connections, whether direct or indirect. The singular forms of "a", "said" and "the" used in the specification of the present disclosure and the appended claims are also intended to include plural forms, unless the context clearly indicates other meanings. It should further be understood that the term "and/or" as used herein refers to and includes any or all possible combinations of one or more associated listed items.

The bending forms of the flexible substrate mainly include small-angle bending (four sides are bent at a small angle with respect to the main body) and large-angle bending (two sides are bent at a large angle with respect to the main body). A bending angle of the small-angle bending is usually less than 90°, and a bending angle of the large-angle bending is usually not less than 90°, so it is usually necessary to design different bonding devices for flexible substrates with different bending angles.

Taking a small-angle-bent flexible substrate as an example, it is usually necessary to design an integrated support matching the flexible substrate in shape to support the flexible substrate during a bonding process. For small-angle-bent flexible substrates with different sizes (for example, different lengths or different widths), multiple supports with different sizes are required, which will inevitably increase cost of the bonding process. For a large-angle-bent flexible substrate, the bonding device usually adopts other types of supports to support the flexible substrate, such as two individual supports.

Figure 3:
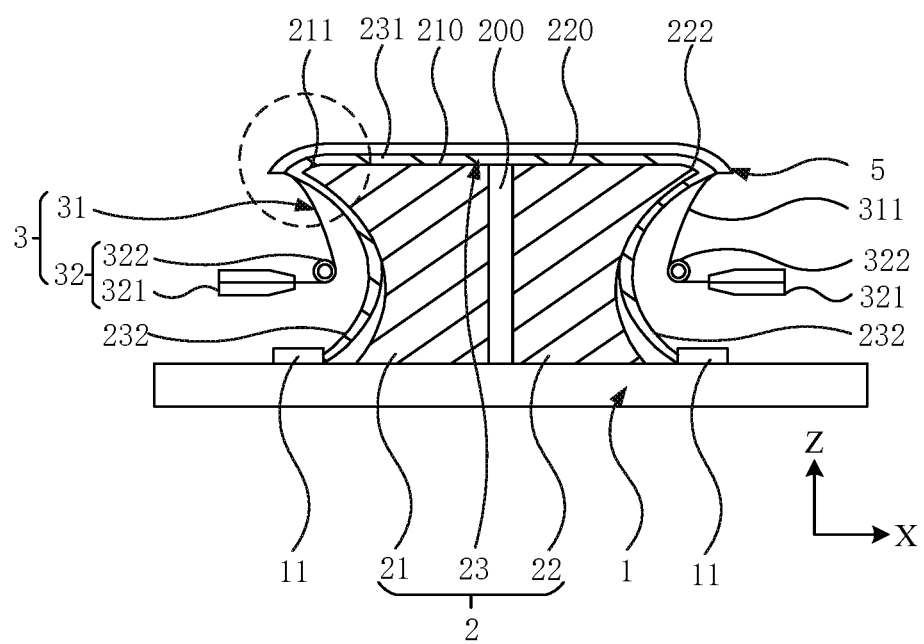
FIG. 3 illustrates a schematic front view of the boding device according to an embodiment of the present disclosure, in which a first supporting body, a second supporting body and a flexible carrier are filled with hatching.
Figure 4:
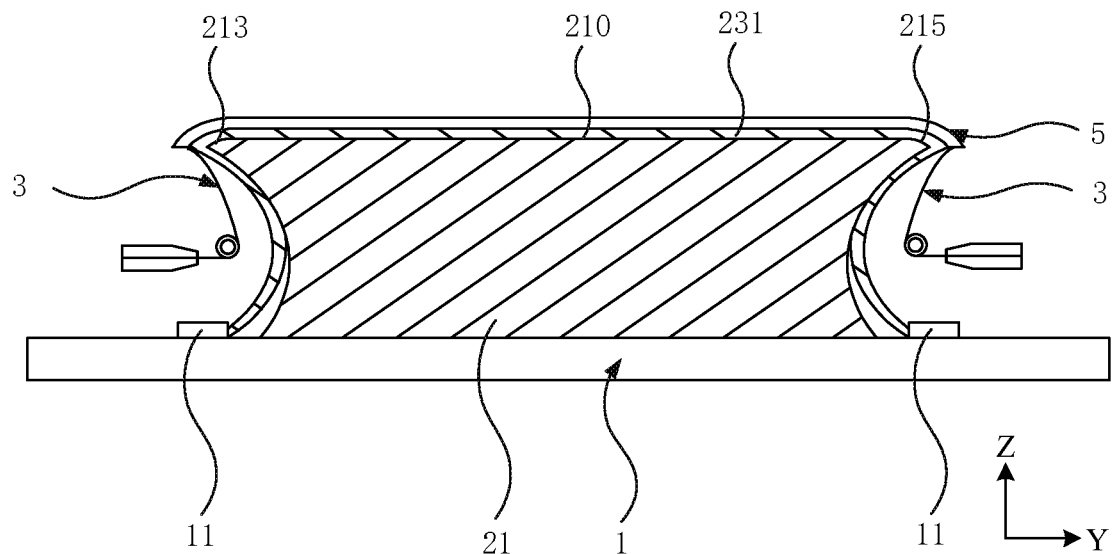
FIG. 4 illustrates a schematic left view of the bonding device as illustrated in FIG. 3.
Figure 5:
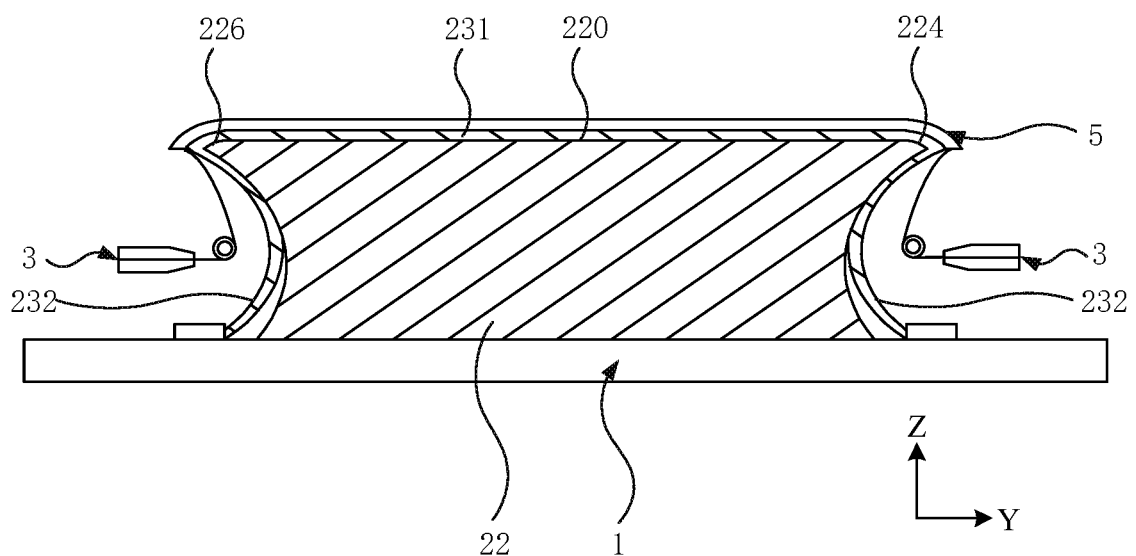
FIG. 5 illustrates a schematic right view of the bonding device as illustrated in FIG. 3.

At least one embodiment of the present disclosure provides a bonding device that has good suitability to both of the two flexible substrates as mentioned above. As illustrated in FIGS. 3 to 5, the bonding device according to an embodiment of the present disclosure includes a supporting assembly 2 and a stretching assembly 3. The supporting assembly 2 is configured to support a flexible substrate 5, and the supporting assembly 2 has an upper surface facing the flexible substrate 5, and the upper surface matches an inner surface 51 of the flexible substrate 5 (as illustrates in FIGS. 1 and 2). The supporting assembly 2 includes a first supporting body 21 and a second supporting body 22 arranged in a first direction X. At least one of the first supporting body 21 and the second supporting body 22 is configured to be movable in the first direction X. The first supporting body 21 and the second supporting body 22 are arranged in this way, so that the supporting assembly 2 can be configured to support flexible substrates 5 of different sizes, and it is also advantageous for the flexible substrate 5 supported by the supporting assembly 2 to enter the protective cover plate to bond the flexible substrate 5 and the protective cover plate. For example, for a large-angle-bent flexible substrate, after the flexible substrate is supported on the supporting assembly 2, the first supporting body 21 and the second supporting body 22 can be made closer, so that the supporting assembly 2 has a relatively small size in the first direction X, and the flexible substrate 5 supported by the supporting assembly 2 can easily enter and approach the protective cover plate.

The stretching assembly 3 includes a carrier film 31, and a central area of the carrier film 31 is configured to be attached to the inner surface 51 of the flexible substrate 5. Each of the four peripheral portions 311 of the carrier film 31 is connected to a driving element 32, and the driving element 32 is configured to stretch the peripheral portion 311 of the carrier film 31 and drive the inner surface 51 of the flexible substrate 5 to align with an upper surface of the supporting assembly 2 and attach to the supporting assembly 2. Two driving elements 32 are arranged opposite to each other in the first direction X, and the other two driving elements 32 are arranged opposite to each other in the second direction Y. The second direction Y and the first direction X are arranged to intersect with each other. The arrangement of the carrier film 31 can facilitate transferring and transporting of the flexible substrate 5 and also facilitate to apply a force by the driving element 32 to the flexible substrate 5. The driving elements 32 at the four different positions can ensure alignment accuracy of the flexible substrate 5 with the supporting assembly 2 in various directions (for example, the first direction X and the second direction Y). In a case that the flexible substrate 5 is subsequently squeezed between the supporting assembly 2 and the protective cover plate to realize the bonding of the flexible substrate 5 and the protective cover plate, the driving elements 32 at the four different positions can ensure attaching tightness between the flexible substrate 5 and the protective cover plate, thereby preventing air bubbles from being left therebetween. Furthermore, the arrangement of the driving elements 32 at the above four different positions can ensure that a flexible substrate can be attached to a protective cover plate well no matter whether it is a small-angle-bent flexible substrate bent or a large-angle-bent flexible substrate.

In combination with the foregoing description, it can be seen that the flexible substrate 5 is supported by the supporting assembly 2, and the stretching assembly 3 can stretch the flexible substrate 5 in the first direction X and the second direction Y, thus a small-angle bending or a large-angle bending of the flexible substrate 5 can be achieved. And further, with various supporting bodies, the bonding device can be adapted to bonding of a small-angle-bent flexible substrate or a large-angle-bent flexible substrate. Since the boding device is not required to be modified in entirety in a case of replacing the support bodies, it is beneficial to reduce the cost and improve the bonding efficiency.

Figure 2:
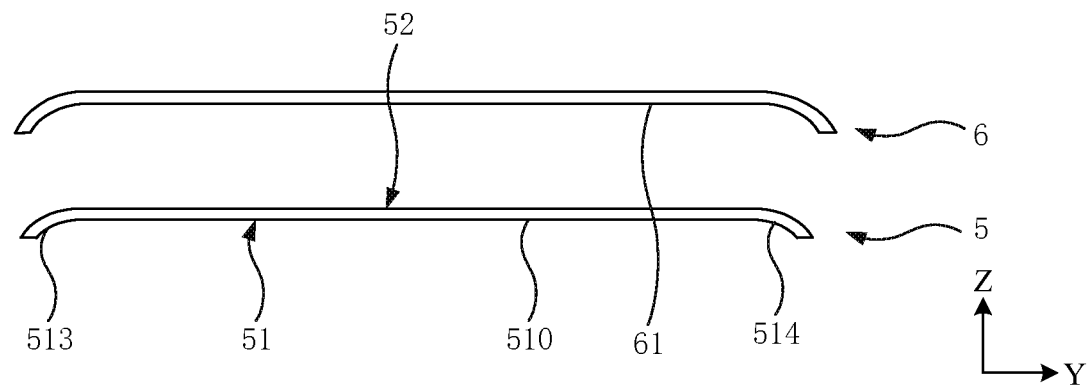
FIG. 2 illustrates a schematic left view of the flexible substrate and the protective cover plate as illustrated in FIG. 1.

Referring to FIG. 1 and FIG. 2, the flexible substrate 5 is configured to be bonded to the protective cover plate 6, and they can form a display device after being bonded. The flexible substrate 5 and the protective cover plate 6 are matched in shape, and "matched in shape" can be understood as the flexible substrate and the protective cover plate have the same or similar shapes to achieve shape matching, so that the protective cover plate 6 and the flexible substrate 5 are bonded. The flexible substrate is, for example, an OLED flexible substrate, which can achieve basic display functions.

The flexible substrate 5 has an inner surface 51 and an outer surface 52. The inner surface 51 is a non-display surface, and the outer surface 52 is a display surface (a surface that displays an image in operation) and is configured to be bonded to an inner surface 61 of the protective cover plate 6. In the illustrated embodiment, the flexible substrate 5 is a small-angle-bent flexible substrate. Correspondingly, an inner surface 51 of the flexible substrate 5 includes an inner plane 510 located in the central area, and a first curved surface 511, a second curved surface 511, a third curved surface 513 and a fourth curved surface 514 which are located peripherally and connected to the inner plane 510. The third curved surface 513 connects a first end of the first curved surface 511 and a first end of the second curved surface 512, the fourth curved surface 514 connects a second end of the first curved surface 511 and a second end of the second curved surface 512, thus, the first curved surface 511, the second curved surface 512, the third curved surface 513, and the fourth curved surface 514 form a ring shape as a whole. The first curved surface 511 and the second curved surface 512 are disposed at a long curved side of the flexible substrate 5, and the third curved surface 513 and the fourth curved surface 514 are disposed at a short curved side of the flexible substrate 5. In other words, the first curved surface 511 and the second curved surface 512 are arranged in a width direction of the flexible substrate 5 (that is, in the first direction X), and the third curved surface 513 and the fourth curved surface 514 are arranged in a length direction of the flexible substrate 5 (that is, in the second direction Y).

Figure 6:
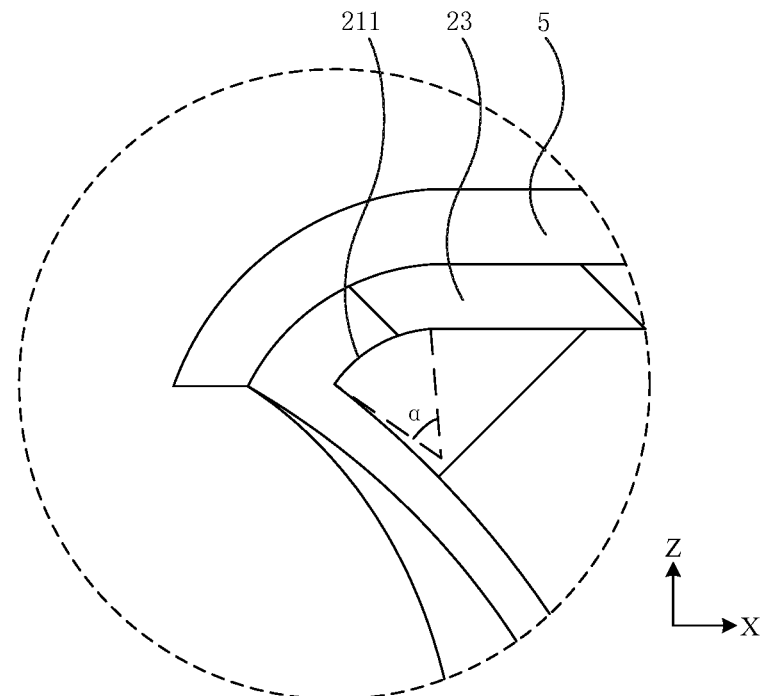
FIG. 6 illustrates a partial enlarged view of FIG. 3.

Referring to FIGS. 3 and 6, in addition to the supporting assembly 2 and the stretching assembly 3, the bonding device may further include a base 1. The first supporting body 21 and the second supporting body 22 of the supporting assembly 2 are both mounted on the base 1, and both the first supporting body 21 and the second supporting body 22 are mounted in a manner of being slidable in the first direction X with respect to the base 1. The first supporting body 21 and the second supporting body 22 are made of a rigid material, and will not or hardly deform during supporting the flexible substrate 5. In some embodiments of the present disclosure, a slide rail (not shown) is provided on the base 1, and the first supporting body 21 and the second supporting body 22 can both be slidably mounted on the slide rail. Both the first supporting body 21 and the second supporting body 22 can be driven by a motor or a cylinder. In this embodiment, a servo motor serves to drive the first supporting body 21 and the second supporting body 22.

The first supporting body 21 has a first supporting surface 211, a third supporting surface 213, and a fifth supporting surface 215. The first supporting surface 211 faces away from the second supporting body 22 and connects the third supporting surface 213 and the fifth supporting surface 215; the second supporting body 22 has a second supporting surface 222, a fourth supporting surface 224 and a sixth supporting surface 226, the second supporting surface 222 facing away from the first supporting body 21 and connects the fourth the supporting surface 224 and the sixth supporting surface 226. Of course, the first supporting body 21 also includes a first plane 210, and the second supporting body 22 also includes a second plane 220. The first plane 210 connects the first supporting surface 211, the third supporting surface 213, and the fifth supporting surface 215, respectively so as to jointly form an upper surface of the first supporting body 21. The first plane is located between the third supporting surface 213 and the fifth supporting surface 215. The second plane 220 connects the second supporting surface 222, the fourth supporting surface 224 and the sixth supporting surface 226, respectively, so as to jointly form an upper surface of the second supporting body 22. The second plane 220 is located between the fourth supporting surface 224 and the sixth supporting surface 226. An upper surface of the first supporting body 21 and an upper surface of the second supporting body 22 jointly form an upper surface of the supporting assembly 2, and the upper surface of the supporting assembly 2 matches the inner surface 51 of the flexible substrate 5, so as to support the flexible substrate 5.

In an embodiment of the present disclosure, the first supporting surface 211 matches the first curved surface 511 (referring to FIG. 1) of the flexible substrate 5 in shape, and is configured to support the first curved surface 511 (or a long curved side) of the flexible substrate 5. The second supporting surface 222 matches the second curved surface 512 (refer to FIG. 1) of the flexible substrate 5 in shape, and is configured to support the second curved surface 512 (or another long curved side) of the flexible substrate 5. The third supporting surface 213 and the fourth supporting surface 224 as a whole match the third curved surface 513 (refer to FIG. 2) of the flexible substrate 5 in shape, and are configured to support the third curved surface 513 (or a short curved side) of the flexible substrate 5. The fifth supporting surface 215 and the sixth supporting surface 226 as a whole match the fourth curved surface 514 (refer to FIG. 2) of the flexible substrate 5 in shape, and are configured to support the fourth curved surface 514 (or (another short curved side). The first plane 210 and the second plane 220 are configured to support the inner plane 510 (refer to FIG. 2) of the flexible substrate 5.

It can be understood that the first supporting surface 211, the second supporting surface 222, the third supporting surface 213, the fourth supporting surface 224, the fifth supporting surface 215, and the sixth supporting surface 226 can all be regarded as circular arc surfaces. A central angle corresponding to the first supporting surface 211 ranges from 20° to 80°, a central angle corresponding to the second supporting surface 222 ranges from 20° to 80°, a central angle corresponding to the third supporting surface 213 ranges from 20° to 80°, a central angle corresponding to the fourth supporting surface 224 ranges from 20° to 80°, a central angle corresponding to the fifth supporting surface 215 ranges from 20° to 80°, and a central angle corresponding to the sixth supporting surface 226 ranges from 20° to 80°. Correspondingly, a central angle corresponding to the first curved surface 511 of the flexible panel 5 ranges from 20° to 80°, a central angle corresponding to the second curved surface 512 ranges from 20° to 80°, and a central angle corresponding to the third curved surface 513 ranges from 20° to 80°, and a central angle corresponding to the fourth curved surface 514 ranges from 20° to 80°. The central angles of the first curved surface 511, the second curved surface 512, the third curved surface 513, and the fourth curved surface 514 can be used to indicate curvature degrees of the corresponding curved surfaces with respect to the inner plane 510, and the range from 20° to 80° is a typical bending angle for a small-angle-bent flexible screen. In the embodiment as illustrated in the drawing, a center angle α corresponding to the first supporting surface 211 is 45° (referring to FIG. 6), and center angles corresponding to the second supporting surface 222, the third supporting surface 213, the fourth supporting surface 224, and the fifth supporting surface 215, the sixth supporting surface 226 are all 45°, which is used for bonding a small-angle-bent flexible substrates with a bending angle of 45°.

For flexible substrates 5 with different widths, at least one of the first supporting body 21 and the second supporting body 22 can be driven to move, so as to adjust a distance between the first and second supporting bodies, so that the first supporting surface 211 support a long curved side of the flexible substrate 5, the second supporting surface 222 support another long curved side of the flexible substrate 5, and the third supporting surface 213, the fourth supporting surface 224, the fifth supporting surface 215, and the sixth supporting surface 226 support two short curved sides of the flexible substrate 5 all the time. Before at least one of the first supporting body 21 and the second supporting body 22 moves, the two short curved sides of the flexible substrate 5 are supported at a central area, and after at least one of the first supporting body 21 and the second supporting body 22 moves, the two short curved sides of the flexible substrate 5 are supported at end areas. It should be understood that flexible substrates with a same bending angle and with different widths can be supported as long as least one of the first supporting body 21 and the second supporting body 22 is configured to be movable in the first direction X.

In an embodiment of the present disclosure, in order to ensure that the two short curved sides of the flexible substrate are effectively supported, in a case that only the first support body 21 is moved, a sliding stroke of the first supporting body 21 is less than a sum of a size of the third supporting surface 213 and a size of the fourth supporting surface 224 in the sliding direction (i.e., the first direction X), and in a case that only the second supporting body 22 moves, a sliding stroke of the second supporting body 222 is less than a sum of a size of the fifth supporting surface 215 and a size of the sixth supporting surface 226 in the sliding direction (i.e. the first direction X). That is to say, in the first direction X, a size of supported area of the flexible substrate 5 is greater than a size of unsupported area of the flexible substrate 5, and the first supporting body 21 and the second supporting body 22 can support more than half of area of the two short curved sides of the flexible substrate, thereby preventing the two short curved sides of the flexible substrate from being deformed in a case of not properly supported during bonding, which affects the bonding effect.

In some embodiments of the present disclosure, as illustrated in FIG. 3, the supporting assembly 2 may further include an elastic supporting body 23 that covers the first supporting body 21 and the second supporting body 22 and is supported by the first supporting body 21 and the second supporting body 22. The elastic supporting body 23 includes a main supporting body 231 and at least four fixing parts 232 arranged along a circumferential direction of the main supporting body 231, and the at least four fixing parts 232 are connected to the main supporting body 231. At least two fixing parts of the at least four fixing parts 232 are arranged in the first direction X, and the remaining fixing parts 232 are arranged in the second direction Y. The first supporting body 21 and the second supporting body 22 support the main supporting body 231, thereby supporting the flexible substrate 5, and the main supporting body 231 can be deformed to match the inner surface 51 of the flexible substrate 5 in shape; the at least four fixing parts 232 are fixed to the mounting part 11 on the base 1 so as to position the main supporting body 231 circumferentially, thereby preventing the supporting body 231 from slipping, wrinkles and etc. that affect the bonding process.

During bonding, the elastic supporting body 23 is deformed under force and provides a surface matching each supporting surface in shape (for matching the inner surface of the flexible substrate), so as to support the flexible substrate 5. That is, the first supporting body 21 and the second supporting body 22 support the flexible substrate 5 through the elastic supporting body 23. In other words, the first supporting body 21 and the second supporting body 22 can support the flexible substrate 5 in a contact manner. At this time, the upper surface of the supporting assembly 2 is formed jointly by the upper surface of the first supporting body 21 and the upper surface of the second supporting body 22; alternatively, the first supporting body 21 and the second supporting body 22 may support the flexible substrate 5 through an elastic supporting body or other intermediate element. At this time, the first supporting body 21 and the second supporting body 22 only provide support and do not contact the flexible substrate 5, and the upper surface of the supporting assembly 2 is formed by the deformed main supporting body 231. In a case of providing an elastic supporting body, the elastic supporting body can effectively support a portion of the flexible substrate corresponding to a space 200 (see FIG. 3) between the first supporting body 21 and the second supporting body 22, thereby improving bonding progress of the flexible substrate.

In the stretching assembly 3, the carrier film 31 is configured to be attached to a side of the flexible substrate 5 facing the base 1 (or the supporting assembly 2), and the driving element 32 is configured to cooperate with the carrier film and to drive the carrier film 31 to be bent by stretching the carrier film 31, thus, the flexible substrate is made in a preset bending state (a small-angle-bent state in the embodiment as illustrated in the drawing).

A central area of the carrier film 31 is configured to be attached to the inner surface 51 of the flexible substrate, and the four peripheral portions 311 of the carrier film 31 are connected to a respective driving element 32. The driving element 32 includes a clamp 321 and a roller 322. The clamp 321 is configured to clamp a peripheral portion 311 of the carrier film 31 and apply a tensile force to the peripheral portion 311, and the roller 322 is configured to support the peripheral portion 311 and change a direction of the tensile force applied to the peripheral portion 311. A direction of a force on the flexible substrate 5 applied by a part of the peripheral portion 311 between the roller 322 and the flexible substrate 5 is substantially along an outer contour of the supporting assembly 2, thus, the flexible substrate 5 is made attached to the supporting assembly 2 better, which helps to improve bonding accuracy. The provision of the roller shaft 322 facilitates arrangement of the clamp 321, and there is no need to arrange the clamp 321 adjacent to the supporting assembly 2.

The driving element 32 is configured to stretch the peripheral portion 311 of the carrier film 31 and drive the inner surface 51 of the flexible substrate 5 to be aligned with and to be bonded to the upper surface of the supporting assembly 2 (in the case of providing the elastic supporting body, the upper surface of the supporting assembly is formed by the elastic supporting body, and in the case of not providing the elastic supporting body, the upper surface of the supporting assembly is formed jointly by the upper surface of the first supporting body and the upper surface of the second supporting body). For example, two driving elements of the four driving elements 32 are arranged in the first direction X, and the other two driving elements of the four driving elements 32 are arranged in the second direction Y. The four driving members 32 apply tensile forces to the carrier film in the first direction X and the second direction Y, so that the flexible panel 5 is bent at a small angle, and the inner surface 51 of the flexible panel 5 matches the upper surface of the supporting assembly 2 in shape.

In order to bond the flexible substrates 5 of different curvature degrees (for example, flexible substrates with large bending angles at both sides), the supporting assembly 2 can be replaced (mainly to replace the first supporting 21 and the second supporting 22) to make it match the flexible substrate 5 to be bonded. Please refer to FIGS. 7 and 8, in some embodiments of the present disclosure, the supporting assembly 2 includes a first supporting body 21 and a second supporting body 22 that are different from those in the previous embodiments, and other structures of the bonding device are same as or similar to those in the previous embodiments. The first supporting body 21 and the second supporting body 22 are configured to support a large-angle-bent flexible substrate 5, so as to bond the flexible substrate 5 and a corresponding protective cover plate. The flexible substrate 5 has an inner surface 51. The inner surface 51 includes a first curved surface 511, an inner plane surface 510, and a second curved surface 512 arranged in a first direction X, and the inner plane surface 510 connects the first curved surface 511 and the second curved surface 512 and is located between the first curved surface 511 and the second curved surface 512. The first supporting body 21 has a first supporting surface 211 facing away from the second supporting body 22, and the second supporting body 22 includes a second supporting surface 222 facing away from the first supporting body 21. The first supporting surface 211 matches the first curved surface 511 of the flexible substrate 5 in shape, and is configured to support the first curved surface 511; the second supporting surface 222 matches the second curved surface 512 of the flexible substrate 5 in shape and is configured to support the second curved surface 512. A central angle corresponding to the first supporting surface 211 is not less than 90°, a central angle corresponding to the second supporting surface 222 is not less than 90°, and correspondingly, central angles corresponding to the first curved surface 511 and the second curved surface 512 are not less than 90°, that is, the bonding device according to this embodiment may be applicable to bond large-angle-bent flexible substrates.

Figure 8:
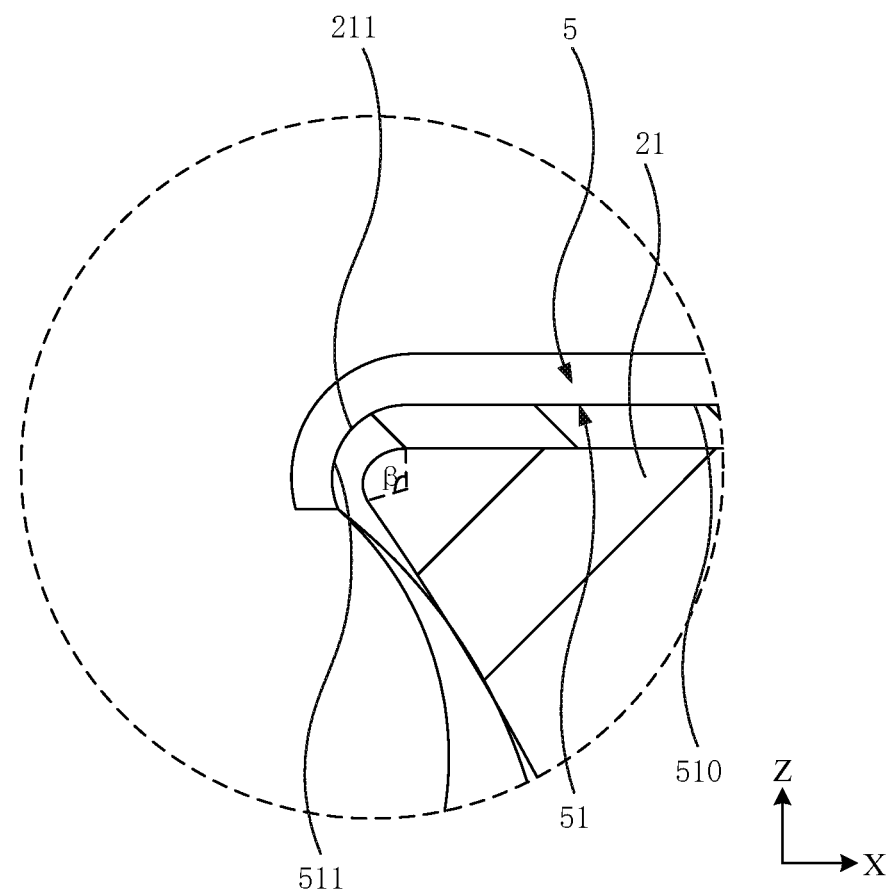
FIG. 8 illustrates a partial enlarged view of FIG. 7.

In some embodiments of the present disclosure, as illustrated in FIG. 8, a central angle βcorresponding to the first supporting surface 211 is 100°, and a central angle corresponding to the second supporting surface 222 is also 100°, which is used for bending a large-angle-bent flexible substrate with a bending angle of 100°.

Figure 7:
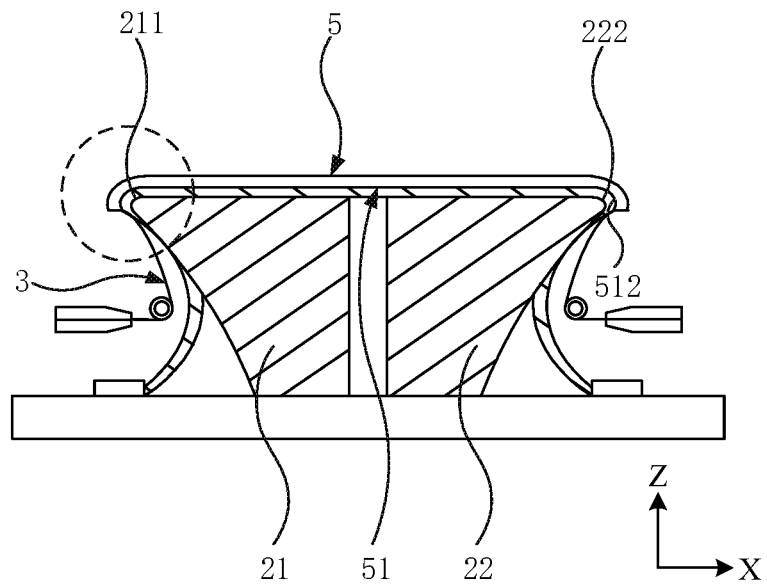
FIG. 7 illustrates a schematic front view of a bonding device according to another embodiment of the present disclosure, in which the first supporting body and the second supporting body have different structures from the first supporting body and the second supporting body as illustrated in FIG. 3.

The base 1 is configured in such a manner that it may be assembled with the first supporting body 21 and the second supporting body 22 as illustrated in FIG. 3 for bonding a small-angle-bent flexible substrate and it may further be assembled with first supporting body 21 and the second supporting body 22 as illustrated in FIG. 7 for bonding a large-angle-bent flexible substrate. The stretching assembly 3 can stretch the flexible substrate in the first direction X and the second direction Y to achieve small-angle bending or large-angle bending of the flexible substrate. As long as different supports are replaced, bonding of flexible substrates with different bending angles can be achieved.

Figure 9:
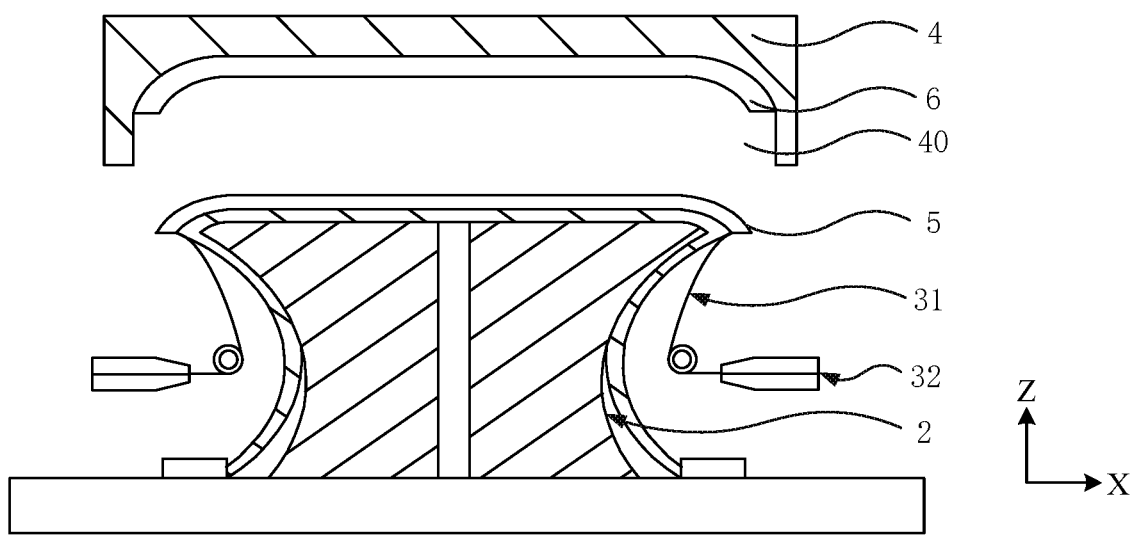
FIG. 9 illustrates a schematic view of bonding a flexible substrate and a protective cover plate by the bonding device as illustrated in FIG. 3.

Referring to FIG. 9, the bonding device may further include a fixing jig 4 configured to fix the protective cover plate 6, and the protective cover plate 6 is configured to be bonded to the flexible substrate 5. The fixing jig 4 is provided with a curved inner surface to form an accommodating space 40 for accommodating the protective cover plate 6, and the protective cover plate 6 is fixed in the accommodating space 40. A servo motor (not shown) drives the flexible substrate 5 along with the supporting assembly 2 which supports the flexible substrate to move along the third direction Z (a direction perpendicular to a length direction Y and a width direction X), and so as to enter the accommodating space 40 in the fixing jig 4. And then, a servo motor drives at least one of the first supporting body and the second supporting body to move to a bonding position along the first direction X. During the movement of the at least one of the first supporting body and the second supporting body, the stretching assembly 3 apply a force to the flexible substrate continuously, so as to guarantee alignment accuracy and bonding accuracy of the flexible substrate 5 and the protective cover plate 6 and avoid forming air bubbles between the flexible substrate 5 and the protective cover plate 6.

Figure 10:
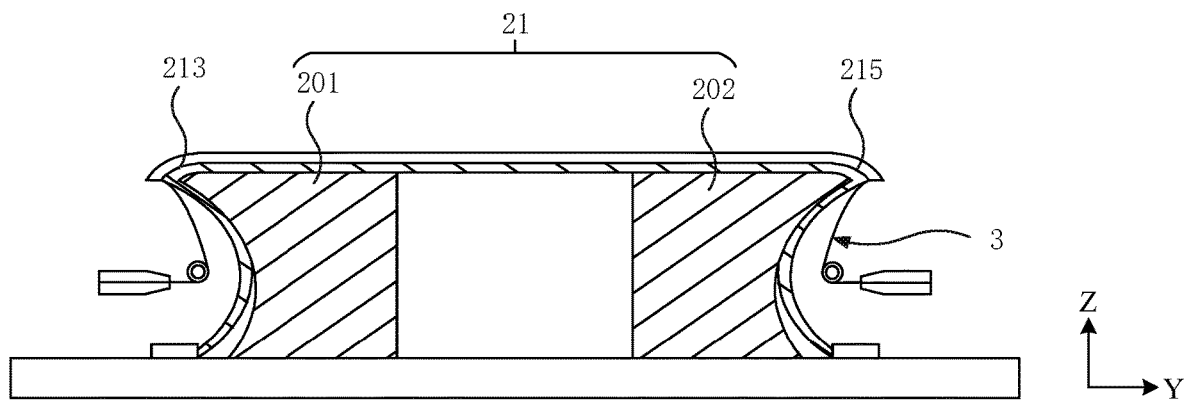
FIG. 10 illustrates a schematic left view of a boding device according to still another embodiment of the present disclosure.
Figure 11:
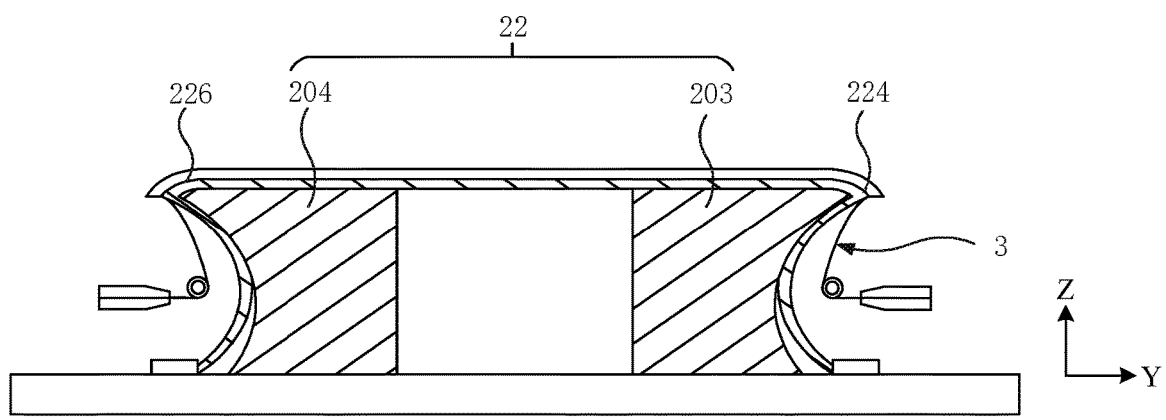
FIG. 11 illustrates a schematic right view of the bonding device as illustrated in FIG. 10.

FIGS. 10 and 11 illustrate another supporting assembly 2. As illustrated in FIGS. 10 and 11, the only difference from the previous embodiment is that the first supporting body 21 includes a first sub-support 201 and a second sub-support 202 arranged in the second direction Y. The second supporting body 22 includes a third sub-support 203 and a fourth sub-support 204 arranged in the second direction Y. At least one of the first sub-support 201 and the second sub-support 202 is configured to be movable in the second direction Y with respect to another sub-support, and at least one of the third sub-support 203 and the fourth sub-support 204 is configured to be movable in the second direction Y with respect to another sub-support. The first supporting surface (similar to the first supporting surface 211 in FIG. 3) is formed jointly by the first sub-support 201 and the second sub-support 202, and the second supporting surface (similar to the second supporting surface 222 in FIG. 3) is formed jointly by a third sub-support 203 and a fourth sub-support 204, the third supporting surface 213 is formed by the first sub-support 201, and the fourth supporting surface 224 is formed by the third sub-support 203, the fifth supporting surface 215 is formed by the second sub-support 202, and the sixth supporting surface 226 is formed by the fourth sub-support 204. Other structures of this embodiment are the same as those of the embodiment as illustrated in FIG. 3, and the front view of the bonding device according to the embodiment is also the same as that of FIG. 3.

Since the first sub-support 201 and the second sub-support 202 can move with respect to each other, and the third sub-support 203 and the fourth sub-support 204 can move with respect to each other, the supporting assembly may support flexible substrates of various lengths by adjusting a distance between the first sub-support 201 and the second sub-support 202 and a distance between the third sub-support 203 and the fourth sub-support 204. The first supporting body 21 can move with respect to the second supporting body 22 as a whole, so the supporting assembly 2 can support flexible substrates of different widths. Therefore, the bonding device according to this embodiment is applicable to bond flexible substrates of various widths and various lengths, and a group of supporting bodies (including the first supporting body and the second supporting body) correspond to a flexible substrate with a bending angle.

On the other hand, at least one embodiment of the present disclosure further provides a bonding method, in which the bonding device as described above is adopted to bond the flexible substrate and the protective cover plate. Please refer to FIG. 9, the bonding method includes:

Step S10: A flexible substrate 5 is placed on the supporting assembly 2 and stretching assembly 3 applies a force continuously to the flexible substrate so as to drive the flexible substrate 5 to bend toward the supporting assembly 2;

Step S20: A protective cover plate 6 is fixed in an accommodating space 40 provided in a fixing jig 4;

Step S30: The supporting assembly 2 and the flexible substrate 5 are driven to enter the accommodating space 40 provided in the fixing jig 4;

Step S40: at least one of the first supporting body 21 and the second supporting body 22 is driven to move to a preset position in the first direction X so as to bonding the flexible substrate and the protective cover plate.

Step S10 and step S20 can be performed synchronously or sequentially. For example, step S10 is performed before step S20 or after step S20, which is not limited herein; in step S30, the preset position is usually determined by a width of the flexible substrate 5 (a size of the flexible substrate in the first direction X). In a case that the first supporting body 21 and the second supporting body 22 are located at the preset position, the flexible substrate 5 matches the protective cover plate 6 in shape, and the flexible substrate 5 and the protective cover plate 6 are bonded. An inner surface of the protective cover plate 6 can be applied with optical adhesive, and is configured to bond the flexible substrate 5 so that the flexible substrate 5 and the protective cover plate 6 can be kept in a bonded state.

After the bonding is completed, at least one of the first supporting body 21 and the second supporting body 22 is driven back to its initial position, and then the supporting assembly 2 is driven to leave the accommodating space 40.

The bonding method according to the above-mentioned embodiment can be applicable to bonding of a large-angle-bent flexible substrate and a small-angle-bent flexible substrate. For small-angle-bent flexible substrates, as a bending angle of the small-angle-bent flexible substrate is less than 90 degree and a corresponding cover plate will not block the movement of the flexible substrate toward the accommodating space, performing sequence of the technical feature of step S30 and the technical feature of Step S40 of the bonding method according to the above-mentioned embodiment can be exchanged, and the performing sequence of the two technical features may not be defined.

The above are only illustrative embodiments of the present disclosure, and do not limit the present disclosure in any form. Although the present disclosure has been disclosed as above in illustrative embodiments, the illustrative embodiments are not intended to limit the present disclosure. One of ordinary skill in the art may conceive of equivalent embodiments according to the disclosed contents without departing the scope of the present disclosure. Any variations, equivalents, and modifications to the embodiments of the present disclosure based on the gist of the present disclosure still falls into the protection scope of the present disclosure. And the protection scope of the present disclosure is limited by the appended claims.

The invention claimed is:

1. A bonding device, comprising:
a supporting assembly, comprising a first supporting body and a second supporting body arranged side-by-side in a first direction, at least one of the first supporting body and the second supporting body configured to be movable in the first direction, the supporting assembly having an upper surface facing a flexible substrate to be bonded, the upper surface matching an inner surface of the flexible substrate; and
a stretching assembly, comprising a carrier film and a plurality of driving elements, a central area of the carrier film configured to be attached to the inner surface of the flexible substrate, at least two first driving elements of the plurality of driving elements arranged opposite to each other in the first direction, at least two driving elements of the plurality of driving elements arranged opposite to each other in a second direction, the plurality of driving elements all connected to a peripheral portion of the carrier film, and the plurality of driving elements configured to stretch the peripheral portion of the carrier film and drive the inner surface of the flexible substrate to align with the upper surface of the supporting assembly;
the supporting assembly comprises an elastic supporting body, the elastic supporting body comprises a main supporting body and at least four fixing parts connected to the main supporting body, the first supporting body and the second supporting body support the flexible substrate through the main supporting body; and
the bonding device further comprises a base, the base is configured to support the supporting assembly, the at least four fixing parts are connected to the base, and two fixing parts of the at least four fixing parts are disposed at opposite sides of the first supporting body and the second supporting body in the first direction, and remaining fixing parts of the at least four fixing parts are disposed at opposite sides of the first supporting body and the second supporting body in the second direction.

2. The bonding device according to claim 1, wherein the inner surface of the flexible substrate comprises a first curved surface, a second curved surface, a third curved surface, and a fourth curved surface, and the upper surface of the supporting assembly comprises a first supporting surface, a second supporting surface, a third supporting surface, a fourth supporting surface, a fifth supporting surface and a sixth supporting surface;
the first supporting surface is disposed on the first supporting body and faces away from the second supporting body, the first supporting surface matches the first curved surface in shape and is configured to support the first curved surface; the second supporting surface is disposed on the second supporting body and faces away from the first supporting body, the second supporting surface matches the second curved surface in shape and is configured to support the second curved surface;
the third supporting surface and the fifth supporting surface are provided on the first supporting body, the fourth supporting surface and the sixth supporting surface are provided on the second supporting body, the third supporting surface and the fourth supporting match the third curved surface in shape and are configured to support the third curved surface; the fifth supporting surface and the sixth supporting surface match the fourth curved surface in shape and are configured to support the fourth curved surface; and
the third supporting surface and the fourth supporting surface are arranged side-by-side in the first direction, and the fifth supporting surface and the sixth supporting surface are arranged side-by-side in the first direction.

3. The bonding device according to claim 2, wherein a central angle corresponding to the first supporting surface ranges from 20° to 80°, and a central angle corresponding to the second supporting surface ranges from 20° to 80°, a central angle corresponding to the third supporting surface ranges from 20° to 80°, a central angle corresponding to the fourth supporting surface ranges from 20° to 80°, a central angle corresponding to the fifth supporting surface ranges from 20° to 80°, and a central angle corresponding to the sixth supporting surface ranges from 20° to 80°.

4. The bonding device according to claim 2, wherein the first supporting body comprises a first sub-support and a second sub-support arranged side-by-side in the second direction, and the second supporting body comprises a third sub-support and a fourth sub-support arranged side-by-side in the second direction, at least one of the first sub-support and the second sub-support is configured to be movable in the second direction, and at least one of the third sub-support and the fourth sub-support is configured to be movable in the second direction; and
the first supporting surface is jointly formed by the first sub-support and the second sub-support, and the second supporting surface is jointly formed by the third sub-support and the fourth sub-support.

5. The bonding device according to claim 2, wherein the bonding device comprises a base, the first supporting body and the second supporting body are configured to be slidable with respect to the base, and a sum of a sliding stroke of the first supporting body and a sliding stroke of the second supporting body is less than a sum of a size of the third supporting surface in the first direction and a size of the fifth supporting surface in the first direction or a sum of a size of the fourth supporting body in the first direction and a size of the sixth supporting surface in the first direction.

6. The bonding device according to claim 1, wherein the inner surface of the flexible substrate comprises a first curved surface and a second curved surface, and the upper surface of the supporting assembly comprises a first supporting surface and a second supporting surface; and
the first supporting surface is disposed on the first supporting body and faces away from the second supporting body, the first supporting surface matches the first curved surface in shape and is configured to support the first curved surface; the second support surface is disposed on the second supporting body and faces away from the first supporting body, the second supporting surface matches the second curved surface in shape and is configured to support the second curved surface.

7. The bonding device according to claim 6, wherein a central angle corresponding to the first supporting surface is not less than 90°, and a central angle corresponding to the second supporting surface is not less than 90°.

8. The bonding device according to claim 1, wherein each of the plurality of driving elements comprises a clamp and a roller, the clamp is configured to clamp a peripheral portion of the carrier film, and apply a tensile force to the peripheral portion of the carrier film, and the roller is configured to support the peripheral portion of the carrier film and change a direction of the tensile force.

9. The bonding device according to claim 1, wherein the base comprises at least four mounting parts, and the at least four fixing parts are connected to the at least four mounting parts respectively.

10. The bonding device according to claim 1, further comprising a fixing jig in which an accommodating space is provided, and the accommodating space is configured to accommodate a protective cover plate to be bonded to the flexible substrate.

11. A bonding method using the bonding device according to claim 10, wherein the bonding method comprises:

placing the flexible substrate on the supporting assembly, and applying a force by the stretching assembly to make the flexible substrate bend toward the supporting assembly;

accommodating the protective cover plate in the accommodating space in the fixing jig;

driving the supporting assembly and the flexible substrate to enter the accommodating space;

driving at least one of the first supporting body and the second supporting body to move to a bonding position; and bonding the flexible substrate and the protective cover plate.

* * * * *